Patented Sept. 25, 1951

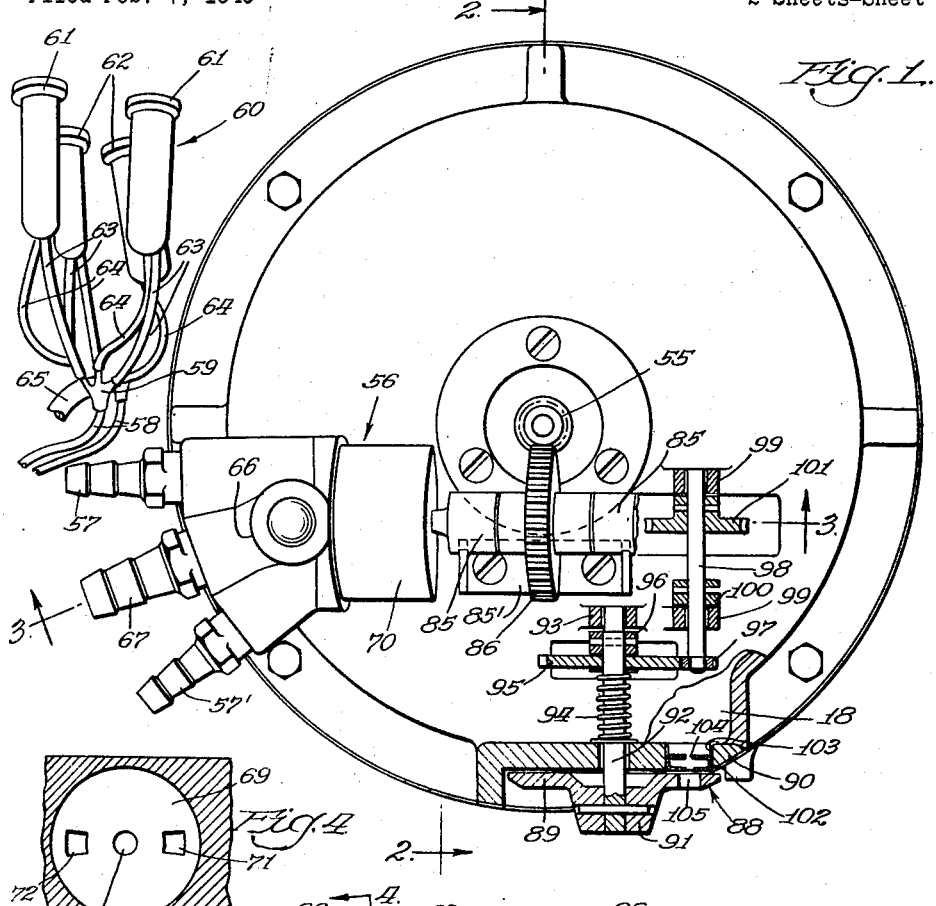

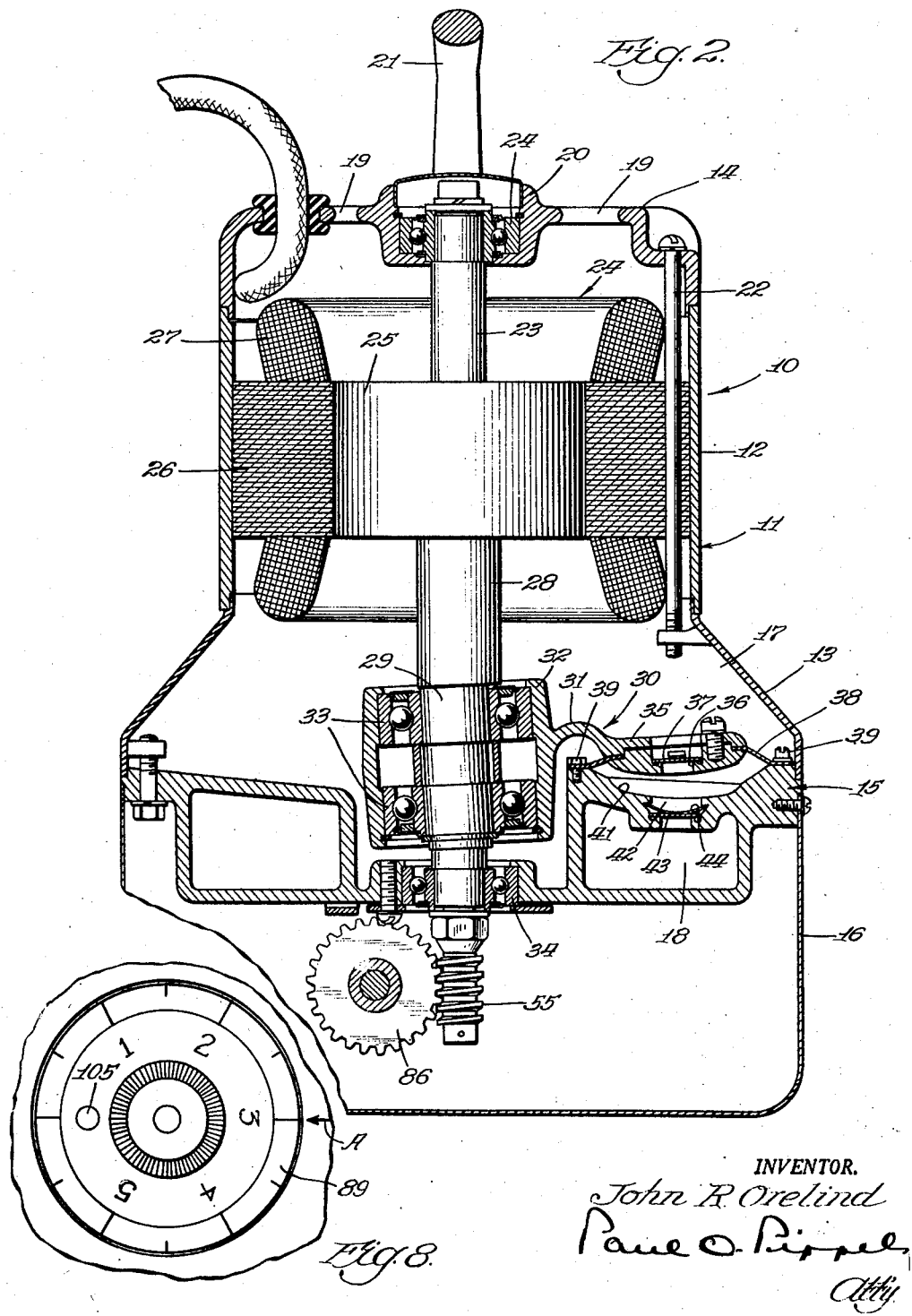

2,569,187

UNITED STATES PATENT OFFICE 2,569,187

PORTABLE MILKING MACHINE

John R. Orelind, Wilmette, Ill.

Application February 7, 1949, Serial No. 74,919

3 Claims. (Cl. 116—73)

This invention relates to a portable milker machine having a novel type of pulsating and timing mechanism. More specifically, the invention relates to a milker unit having an improved timing and signaling mechanism.

This application is a continuation-in-part of applicant's co-pending application relating to a portable milking machine, Serial No. 794,495 filed December 30, 1947. Applicant's novel invention with which the present application is concerned resides in a portable milking machine having a power unit, vacuum pump, pulsator and timing mechanism embodied in the same housing and cooperating with one another to provide an efficient milking machine having a signaling and timing means that will accurately indicate the elapsed time in a timed milking operation.

A prime object of this invention, then, is the provision of an improved milking machine having a novel power unit and drive mechanism for actuating a pulsating valve mechanism which is connected to and synchronized with an indicating and signaling means for indicating the time elapsed in a milking operation.

Still another object is to provide a milking machine having a pulsating mechanism driven by a power unit, the driving means therefor including a shaft which also rotates a signaling member, the signaling member being synchronized with the pulsator to accurately and efficiently indicate the time elapsed in a timed milking operation.

These and other objects will become further apparent upon reading the description when examined in conjunction with the drawing.

In the drawings:

Fig. 1 is a bottom view of a portable milker unit showing a pulsating valve mechanism and an indicating and signaling device, said milker unit being connected to a teat cup cluster, the connections therefor being schematically shown.

Fig. 2 is a sectional view through the milker unit taken substantially along the line 2—2 of Fig. 1.

Fig. 3 is a sectional view taken substantially along the line 3—3 of Fig. 1.

Fig. 4 is a sectional view showing a valve seat taken along the line 4—4 of Fig. 3.

Fig. 5 is a front detail view of a distributor valve.

Fig. 6 is a side view of the same.

Fig. 7 is a rear view of the distributor valve.

Fig. 8 is a detail view showing the dial of an indicating and signaling device.

Referring particularly to Figs. 1 and 2, a milker unit is generally designated by the reference character 10. The milker unit includes a housing 11 consisting of a plurality of cylindrical sections 12 and 13. A top cover member 14 is provided at the upper end of the housing 11. A casing 15 is rigidly secured to the lower end of the cylindrical section 13 and a lower cover 16 is attached to the casing 15.

The housing 11 includes an air or atmosphere chamber 17 positioned above the casing 15. A vacuum or sub-atmosphere chamber 18 is provided within the casing 15.

As shown in Fig. 2 the top cover member 14 is provided with openings 19 arranged to provide for the entry of air into the housing 11. A hub portion 20 of the cover member 14 includes a handle 21. The cover 14 and cylindrical section 12 are connected to the cylindrical section 13 by means of one or more securing members 22.

A shaft 23 is provided for rotation within the housing and forms part of an electrical power unit or motor generally designated by 24. The shaft 23 is connected to a rotor or armature 25 which is arranged to rotate within a field core 26. The field core 26 forms part of a field winding 27 in a conventional manner. The shaft 23 is provided at its lower end with a shaft extension 28 having a turned down lower end 29 which extends into the mechanism of a wobble plate pump generally indicated by the reference character 30.

The wobble plate pump includes a wobble plate 31 which has at its rear end a hub portion 32. The hub portion 32 is provided with a pair of spaced bearing members 33 which are secured within said plate. The turned down end 29 of the shaft extension 28 is journalled at its lower end in a bearing 34 positioned within the casing 15. The wobble plate 31 also includes an arm or extension 35 having a valve opening 36. A flexible valve 37 of spring-like material is positioned over the valve opening 36 for opening and closing the same. A flexible diaphragm 38 is rigidly secured at its inner edge to the arm or extension 35. The diaphragm is further rigidly secured at its outer end by fastener members 39 which are connected to the casing 15. The casing 15 is provided with a dish shaped portion 41 having an opening 42 in alignment with the opening 36 of the arm or extension 35. A flexible valve element 43 is secured over the opening 42 by means of a leaf spring 44.

A worm 55 is connected to the turned down end 29 of the shaft extension 28. The worm 55 is provided to actuate an air distributing member or valve generally designated by the reference character 56.

As best shown in Figs. 1 and 3 the casing 15 is provided with a pair of teat cup connections 57 and 57' which extend outwardly of the housing 11. The teat cup connections 57 and 57' are in turn connected to conduits 58, the connection being schematically shown in Fig. 1. The conduits 58 are in turn connected to a milker claw 59 which forms part of a teat cup cluster 60. The teat cup cluster 60 includes two sets of teat cups or teat cup inflations 61 and 62. To each teat cup there are connected milk conduits 63 and pressure conduits 64. A milk run off conduit 65 is in turn connected to the milker claw 59. The type of construction here indicated is conventional in the art, said teat cups including rubber inflations (not shown) in the usual manner.

The casing 15 is provided with a projecting structure 66 to which is connected a constant vacuum fitting 67. The structure 66 is also provided with a vertical bore 68 which is in communication with an annular valve seat 69 best shown in Fig. 4. The valve seat 69 is provided to seat a rotatable valve member 70. The valve seat 69 further includes openings 71 and 72 respectively positioned for communication with the teat cup connections 57 and 57'. A central opening 73 is in communication with the vertical bore 68 and the constant vacuum connection 67.

As best shown in Figs. 5, 6 and 7 the valve member 70 includes an upper arcuate slot or atmosphere connection 74 which extends completely through the valve member 70. The valve member 70 is further provided with a lower arcuate recess or vacuum connection 78. The recess 78 is in communication with a vertical recess 79 which in turn is at all times in communication with the constant vacuum fitting 67 by means of the bore 73.

As best shown in Fig. 7, the rear face of the valve member 70 is provided with a square opening 80 which is in mating engagement with a square shaft extension 81. The shaft extension 81 forms part of a shaft 82 which is journalled in a pair of laterally spaced bearings 83 and 84. The bearings 83 and 84 are supported by means of spaced collars 85 supported on a supporting member 85'. Spaced intermediately between the bearing members 83 and 84 is a pinion or gear 86. The gear or pinion 86 is in driving engagement, as best shown in Fig. 2, with the worm 55.

A worm 87 is connected at the outer end on shaft 82 and this worm is arranged to actuate an indicating and signaling mechanism generally indicated by the reference character 88.

The indicating and signaling mechanism 88 includes a rotatable cap member or dial 89 as best shown in Figs. 1 and 8. The dial 89 is positioned to rotate on the outer surface of a portion of the casing designated by the reference character 90. The cap member 89 includes a knob 91 which is arranged so that the operator may grip the same for turning said dial. The dial 89 is rigidly secured to a shaft 92 extending inwardly into the housing 11. The shaft 92 is journalled within a stationary supporting member 93 which is in turn connected to the casing 15. A coil spring 94 encircles the shaft 92 and is in abutting relation at one end with the portion 90 of the housing 15. The free end of the coil spring 94 is in abutment with a gear 95 which is in turn adjacent to a stop 96. The gear or pinion 95 is also in meshing engagement with a gear 97 secured to a shaft 98. The shaft 98 is journalled in stationary members or projections 99. A thrust member 100 is connected to the shaft and is in bearing against one of the stationary members 99. The shaft 98 is further connected to and rotated by a gear 101. The gear 101 is in meshing engagement with the worm 87 and is rotated thereby.

As shown in Fig. 1, the signaling element or whistle 102 is rigidly secured within an opening 103 formed in the portion 90. The whistle 102 is also provided with a substantially small opening 104 which in turn may be placed in alignment with an opening 105 formed in the dial.

As best shown in Fig. 8, the dial is provided with indices from 0 to 5, said indices indicating time as related to a timed milking operation. The opening 105 is generally placed in the dial at the zero indice for a reason which will become apparent later.

Upon actuating the electric motor 24 the wobble pump 30 is placed into operation. As best shown in Fig. 2, the turned down end 29 of the shaft 28 is angularly positioned and connected to the wobble plate 31. Therefore, upon rotation of the turned down end 29 of the shaft, the arm or extension 35 is placed into reciprocating movement. The diaphragm 38 normally seals the space between the arm 35 and the dish shaped portion 41. The arm 35 is contoured to fit into the dish shaped portion 41 and as this arm moves away from said portion the valve 43 opens and by virtue of the depression within the above mentioned space, air rushes past the valve 43 into said space. Upon the downward stroke of the arm 35 the valve 43 closes the valve 37 is forced open to permit the escape of air into the atmosphere chamber 17. The chamber 18 is therefore placed in a sub-atmosphere or vacuum condition by means of the action of the wobble plate.

The chamber 18 is continuously in communication with the vertical bore 68 and the fitting 67, whereby a constant vacuum is maintained therein. The fitting is in turn connected to a milker pail (not shown).

The chamber 18 is also in continual communication with the bore 73 which is in communication with the recess 79. The valve member 70 is rotated by means of the gear 86 which is in meshing arrangement with the worm 55. As the valve member 70 rotates, the lower arcuate recess 78, which is under continual vacuum, is placed into communication with the opening 72. Since the opening 72 is in turn in communication with the teat cup connection 57' a vacuum condition within said connection takes place. When this occurs the set of teat cups 61 is subjected to a vacuum and a pulsation takes place. In a similar manner the arcuate recess 78 is moved into communication with the opening 71. A vacuum condition within the connection 57 takes place causing a vacuum pulsation in the teat cups 62.

The cycle of operation may be summarized as follows:

The recess 78 is placed in communication with the opening 72 and teat cup connection 57' thereby effecting a vacuum pulsation in teat cup set 61. At this point the opening 71 is placed in alignment with slot 74 and the teat cup connection 57 is subjected to the atmosphere, thereby breaking the vacuum within the set of teat cups 62. The opening 72 and teat cups 61 are now under vacuum and the rotation of the valve member continues until the recess 78 is no longer in communication with the opening 72.

Referring now particularly to Fig. 1, the rotation of the gear 101 by means of the worm 87 causes rotation of the gear 95. As the gear 95 rotates so does the dial or cap member 89. Assuming for instance that a cow has a milking period of approximately three minutes. The operator first rotates the dial from the zero position until the indice 3 is opposite the arrow A, which may be stenciled on the portion 90 of the casing 15. The dial 89 may be readily turned since the shaft is free to journal with respect to the gear 95. The spring presses the gear 95 against the stop 96, but the connection is sufficiently resilient so that the shaft 92 may be rotated by the operator without effecting turning movement of the gear 95. As the pulsator is functioning the valve member 70 is rotating and the gear 95 is rotating by means of the gear arrangement previously described. The pressure of the spring 94 which presses the gear 95 against the stop 96 is sufficiently great so that driving arrangement between the shaft and gear is effected. As the shaft 92 rotates the dial 89 is also rotated. The dial continues rotating until the opening 105 is in alignment with the opening 104 of the whistle 102. At that time the zero indice lines up with the arrow A and the whistle starts functioning since the opening 103 is in communication with the vacuum chamber 18 as shown in the broken away portion of Fig. 1.

The operator therefore has both visible and audible means whereby he may be notified that the time in a timed milking operation has elapsed. The number of pulsations per minute are accurately determined and the indicating and signaling device is so synchronized with the pulsating mechanism that an accurate mechanism is provided for maintaining a timed milking operation.

It can now be seen that a novel portable milker unit has been provided which is of compact construction and includes an improved valve mechanism whereby the efficiency of the milking operation is greatly enhanced. By virtue of the indicating and signaling means, it is clear that the operator at all times has complete control of the timed milking operation so that a greater amount of efficiency in milking is afforded.

It is to be understood that modifications and changes may be made in this construction which do not depart from the spirit of the invention as disclosed nor as defined in the appended claims.

What is claimed is:

1. A timer for a milking machine, said timer comprising a housing structure having a vacuum chamber, a rotatable member mounted on said housing structure, a whistle opening in communication with said vacuum chamber, said rotatable member having a bore adapted to register with said whistle opening at one point during rotation of said rotatable member, means for rotating said rotatable member, said means including a first shaft connected to said rotatable member, a first gear rotatably mounted on said first shaft, a spring carried by said first shaft, a stop rigidly secured to said first shaft, said spring being constructed to urge the first gear into frictional contact with said stop thereby imparting movement of said first gear to said first shaft, a second gear of reduced diameter in meshing engagement with the first gear, means supporting said second gear including a second shaft in driving engagement with said second gear, a third gear secured to said second shaft, a rotatable valve member, said rotatable valve member being adapted to provide for intermittent vacuum pulsations in the teat cups of a vacuum actuated milking machine, means connected to said rotatable valve member and to said third gear for rotating said third gear in response to rotation of said valve member, whereby the rotatable member is rotated and whereby the bore of the rotatable member is moved into registry with the whistle opening thereby connecting the vacuum chamber with the atmosphere and to emit an audible signal, the movement of the rotatable member being simultaneous with the movement of the rotatable valve member to indicate the time elapsed in a timed milking operation.

2. A timer for a milking machine, said timer comprising a housing structure having a vacuum chamber, a whistle having an opening in communication with said vacuum chamber, a rotatable member mounted on said housing structure, said rotatable member having a bore adapted to register with said whistle opening at one point during rotation, means for rotating said rotatable member, said means including a shaft connected to the rotatable member for rotation therewith, a gear mounted on said shaft and adapted to rotate with respect to the shaft, a stop rigidly secured to said shaft, a resilient member carried by said shaft, said resilient member being constructed to engage the gear and urge the same into frictional engagement with the stop for locking said gear to said shaft, a rotatable valve member, said rotatable member being adapted to provide for intermittent vacuum pulsations in the teat cups of a vacuum actuated milking machine, means connected to said rotatable valve member and to said gear for rotating said gear in response to rotation of said valve member, whereby the rotatable member is rotated and whereby the bore of the rotatable member is moved into registry with said whistle opening thereby exposing the vacuum chamber to the atmosphere and to emit a signal to indicate the time elapsed in a timed milking operation.

3. A timer for a milking machine, said timer comprising a housing structure having a vacuum chamber, a signal having an opening in communication with said vacuum chamber, a rotatable member mounted on said housing structure, said rotatable member having a bore adapted to register with said signal opening at one point during rotation of said rotatable member, means for rotating said rotatable member including a driven member connected to the rotatable member, a rotatable valve member, said rotatable valve member being adapted to provide for intermittent vacuum pulsations in the teat cups of a vacuum operated milking machine, rotatable means connected to said rotatable valve member and to said driven member for rotating said driven member, whereby said rotatable member is moved into registry with the signal opening to expose the vacuum chamber to the atmosphere and to emit an audible signal, the movement of said rotatable member being in response to the movement of the rotating valve member to indicate the time elapsed in a timed milking operation.

JOHN R. ORELIND.

REFERENCES CITED

The following references are of record in the file of this patent:

UNITED STATES PATENTS

| Number | Name | Date |
| --- | --- | --- |
| 2,342,327 | Braun | Feb. 22, 1944 |
| 2,427,312 | Thompson et al. | Sept. 1947 |